3,564,696
APPARATUS FOR REMOVING OIL OR GREASE SEALS
Joseph F. Shepanski 216 Huffman Mill Road,
Burlington, N.C. 27125
Filed May 29, 1968, Ser. No. 733,140
Int. Cl. B23p 19/02
U.S. Cl. 29—235  4 Claims

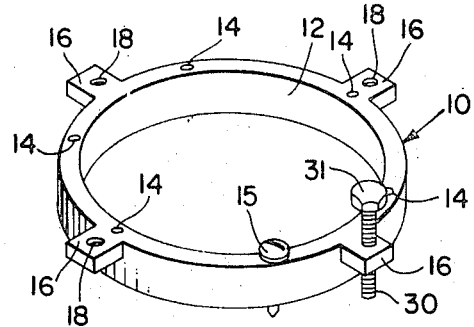
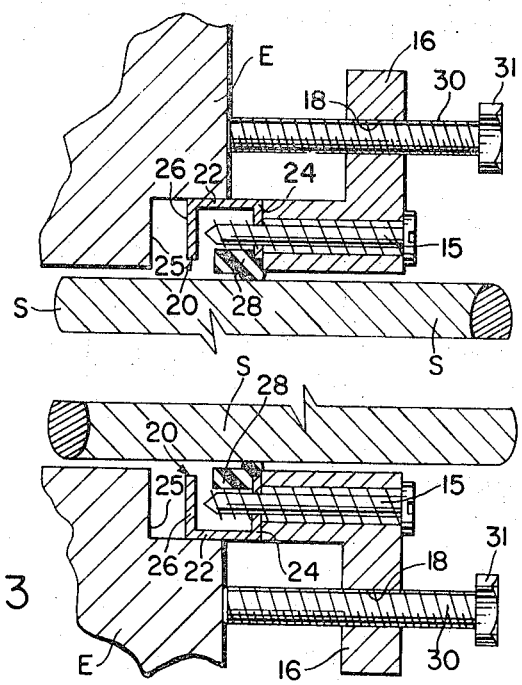
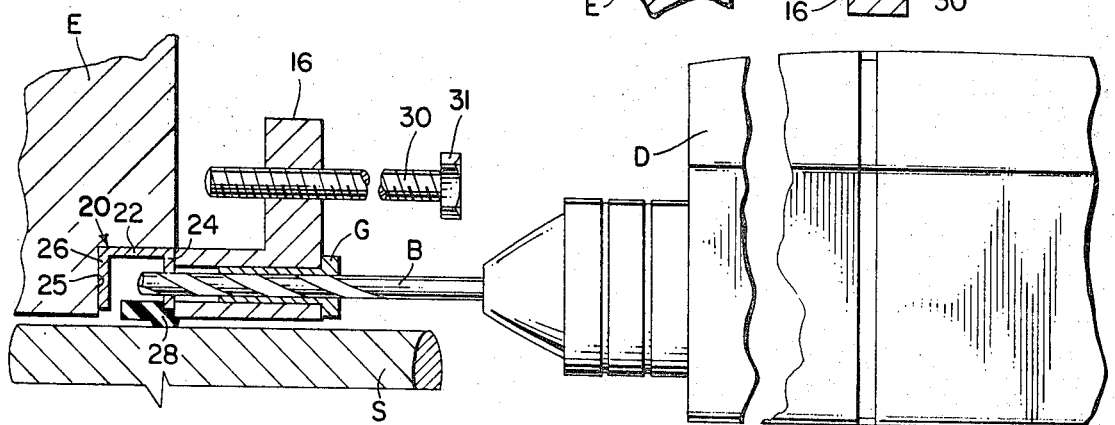
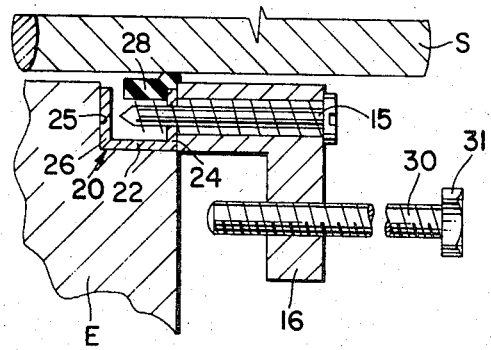
FIG. 1
FIG. 3
FIG. 2
INVENTOR.
JOSEPH F. SHEPANSKI
BY
ATTORNEY

United States Patent Office 3,564,696
Patented Feb. 23, 1971

ABSTRACT OF THE DISCLOSURE

The present invention is directed to apparatus for more quickly removing oil or grease seals from engines while preventing damage to the engine housing or shaft.

BACKGROUND OF THE INVENTION

In the conventional engines in use today, a rotating crankshaft extends through an opening in the wall of the engine housing or crankcase where it is surrounded by an oil seal which confines the oil and grease within the crankcase. Such seals are generally press fit into a recess in the bore of the housing and after use may become very tightly wedged therein. The seals comprise a U-shaped annular ring with a resilient gasket member adhered to the inner edge of one of the lips and adapted to bear against the rotating shaft. After a period of use the rubber or other resilient material becomes brittle from the heat and wears out due to the friction between it and the seal edges, the oil or grease leaks, and the seal has to be replaced. There is no known tool available for performing this operation, except a screw driver, wedge, or a similar instrument.

These tools are generally objectionable, because of the likelihood of scarring, gouging or otherwise damaging the walls of the bore in the housing while removing the seal. Moreover, the length of time necessary to remove the seal, which has become extremely tight in the bore, quite often is extensive, as much as two to three hours.

SUMMARY OF THE INVENTION

The present invention as described herein sets forth a tool for removing seals without the above stated objections. Briefly, the tool comprises an annular ring approximately the same diameter as the seal with openings extending axially through the ring at positions spaced around the ring. The openings loosely receive self tapping metal screws which are adapted to be threadedly fastened to the exposed metal flange of a seal to be removed.

A plurality of lugs extend radially outward from the annular ring, include a second set of openings receiving bolts therethrough which bear against the outer surface of the housing itself. After the metal screws are installed, securing the annular ring to the seal, bolts are threaded through the openings in the lugs and brought to bear against the housing, forcing the tool and seal outwardly therefrom. In such a manner the seal is easily removed in about ten minutes with the tool as compared with as much as two or three hours without the tool.

It is therefore an object of this invention to provide a tool for removing oil seals from engines without damaging the housings of the engines.

It is another object of this invention to provide a tool for removing oil seals from engine housings much more quickly than heretofore.

Some of the objects of the invention having been stated, other objects will appear as the description proceeds when taken in connection with the accompanying drawings, in which:

FIG. 1 is a perspective view of the tool according to the present invention;

FIG. 2 is a longitudinal sectional view, with parts broken away, showing the tool fastened to a seal for removal from an engine housing;

FIG. 3 is a view similar to FIG. 2 but showing the seal in the process of being removed.

Referring now to the drawings and more particularly to FIG. 1, the seal removing tool 10 comprises a support member which may take the form of an annular ring 12 having a plurality of passageways 14 extending axially therethrough and equally spaced around the ring.

A plurality of lugs 16 extend outwardly from the annular ring 12 at equally spaced positions around the tool. Lugs 16 are shown in FIG. 1 to be of a thickness approximately one-third the height of wall 12, however the lugs may be of any desired thickness. Each lug 16 is provided with a tapped opening 18 extending axially therethrough for reasons to be hereinafter described.

Seal 20 conventionally includes an annular flanged member 22 with outer and inner parallel flanges 24 and 26. Seal 20 has a slightly larger diameter than the diameter of the opening in the housing, so that the seal is press fit into the housing. A shoulder 25 provides a stop means which engages inner flange 26 upon assembly of seal 20 to housing E. An annular gasket 28 of rubber or some other suitable resilient material is suitable attached to outer flange 24 of the seal 20 so that the resilient gasket 28 bears against rotating shaft S of engine housing E.

In use, according to FIGS. 2 and 3, the tool 10 is positioned adjacent the damaged seal in some suitable manner with the bottom surface of annular wall 12 being in engagement with the seal 20. It is to be noted that the diameter of annular wall 12 is shown as being approximately the same as the diameter of seal 20. Referring to FIG. 2, the next step is to insert a guide pin G in one of openings 14 in annular ring 12, then pass the bit B of a hand drill D through the pin and opening to provide a starter hole in the outer flange 22 of seal 20. This step is repeated for each of the openings 14. Subsequently, sheet metal or self tapping screws 15 are loosely inserted through passageways 14 and into the starter holes in the seal, after which the screws 15 are threadedly embedded in the seal whereby the tool 10 is securely fastened to seal 20.

Bolts 30 are of such length that when inserted through tapped passageways 18 in lugs 16 and brought to bear against the surface of the housing E, there remains a section of the bolt between the bolt head 31 and the upper surface of lug 16. The bolts 30 are subsequently tightened further, which overcomes the frictional resistance of the seal and forces the seal 20 to move outwardly from its seat in housing E as shown in FIG. 3.

Thus there is provided a tool for removing damaged or worn seals from engine housing without damaging the housing, and in much less time than heretofore.

It is obvious that modifications could be made to the tool, without departing from the scope of the invention. For example, rather than the annular ring 12, the support member could be cut into segments, with or without a means for fastening the segments together after assembly around a shaft. Such an embodiment would be useful if the configuration or location of the shaft and seal made it difficult to assemble the illustrated embodiment in operative relation with the seal to be removed. Moreover, the spacing and number of the passageways 14 and lugs 16 can be varied as desired. Since the passageways 14 in annular ring 12 must register with the flange 24 of seal 20, the annular ring 12 could be enlarged radially and provided with groups of holes spaced successively greater distances from the axis of the tool, whereby the same tool might be used for several sizes of seals.

Although the invention as described above is particularly adapted for use in the removal of oil seals surrounding a crankshaft, it is to be recognized the tool could be used to release any annular seals which surround a shaft and which are press fit into the wall of a housing.

Therefore it is to be understood that the foregoing description and accompanying drawings comprehend only the general and preferred embodiment of the invention, and that various changes in construction, arrangement and general combination of parts may be made without departing from the spirit and scope of the invention. The scope of the invention is indicated by the subsequent claims, rather than the foregoing description.

I claim:
1. A tool for removing a seal from an engine housing having a shaft of any length extending therefrom, said seal normally being of the type comprising a U-shaped annular ring surrounding said shaft and having a resilient gasket adhered to the inner edge of at least the exposed lip of said ring for bearing against said shaft, said tool comprising:
   (a) an annular support having a central opening therein for positioning said support about said shaft in overlying substantially coextensive relation to the shaft surrounding seal when said shaft is in an assembled position, said annular support having a series of fixed position axial passageways extending therethrough for the selective guiding of seal piercing means and seal attaching means therethrough and into engagement with the exposed lip of said seal, said passageways aligning generally centrally along the exposed lip of the seal; and
   (b) said tool further including bearing means on said annular support for bearing against said housing outward of said seal and urging said annular support and seal as an assembly from the engine housing.

2. The tool according to claim 1 wherein said seal attaching means comprise a plurality of self-tapping screws, said screws being adapted to extend centrally into the exposed lip of the seal and unite the support and seal.

3. The tool according to claim 1 wherein said bearing means comprises a plurality of integral radially outward extending lugs on the outer portion of said support, said lugs being of reduced height relative to said support, each of said lugs including a threaded passageway therethrough adapted to receive a bolt which may be tightened down onto the surface of the housing to urge the support and seal therefrom.

4. The tool according to claim 3 wherein said seal attaching means comprises a plurality of self-tapping screws, said screws being adapted to extend centrally into the exposed lip of the seal and unite the support and seal.

References Cited

UNITED STATES PATENTS

| | | | |
|---|---|---|---|
| 2,113,755 | 4/1938 | Billington | 29—256 |
| 2,618,052 | 11/1952 | Skaggs | 29—256 |
| 3,014,271 | 12/1961 | Englund | 29—263 |
| 3,085,786 | 4/1963 | Deuss | 29—256X |
| 3,363,488 | 1/1968 | Thau | 77—62 |
| 3,174,218 | 3/1965 | McConaha | 29—263X |

LESTER M. SWINGLE, Primary Examiner

J. C. PETERS, Assistant Examiner

U.S. Cl. X.R.

29—256